United States Patent [19]

Morozumi et al.

[11] Patent Number: 4,591,848
[45] Date of Patent: May 27, 1986

[54] MATRIX PANEL WITH AN ACTIVE DRIVING SYSTEM

[75] Inventors: Shinji Morozumi; Toshiyuki Misawa; Yoshio Nakazawa, all of Suwa, Japan

[73] Assignee: Seiko Epson Corporation, Tokyo, Japan

[21] Appl. No.: 481,049

[22] Filed: Mar. 31, 1983

[30] Foreign Application Priority Data

Apr. 1, 1982 [JP] Japan ................................. 57-54339
Apr. 6, 1982 [JP] Japan ................................. 57-56945

[51] Int. Cl.[4] .............................................. G09G 3/36
[52] U.S. Cl. .................................... 340/784; 340/805; 340/719
[58] Field of Search ............... 340/784, 793, 719, 718, 340/805

[56] References Cited

U.S. PATENT DOCUMENTS

4,266,223  5/1981  Frame ................................ 340/719
4,395,708  7/1983  Lloyd ................................ 340/719

OTHER PUBLICATIONS

114-SID 81 Digest, 11/6-4:25 PM, Dichroic Guest-Host Active Matrix Video Display; Minoru Hosokawa, Kouichi Oguchi, Masayuki Ikeda, Satoru Yazawa and Kenichi Endo, Suwa Seikosha Company, Ltd., Nagano-ken, Japan.
CH1520 1980-Biennial Display Research Conference, A Liquid-Crystal TV Display Panel Using a MOS Array with Gate-Bus Drivers; K. Kasahara, T. Yanagisawa, K. Sakai, T. Adachi, K. Inoue, T. Tsutsumi and H. Hori.
CH1520 1980-Biennial Display Research Conference, A Low-Leakage-Current Thin-Film Transistor for Flat-Panel Displays, F. C. Luo, I. Chen and F. Genovese.

Primary Examiner—Marshall M. Curtis
Attorney, Agent, or Firm—Blum Kaplan Friedman Silberman & Beran

[57] ABSTRACT

In the matrix, a positive type liquid crystal of the twisted nematic type is driven by a thin film transistor arranged on a transparent substrate. The polarity of the video signal, originally generated for a cathode ray tube, is inverted within a driving circuit and the inverted negative video signal is used to drive the positive type liquid crystal display. In the range of voltages of the video signal which correspond to the white level, the active matrix panel is driven by stretching the voltage of the video signal such that comparable voltage-contrast characteristics are achieved with the liquid crystal display as with the cathode ray tube. Leakage current of the thin film transistor during off-periods is reduced by setting a gate voltage during the off-period which is within the range of voltage level of the power source.

19 Claims, 24 Drawing Figures

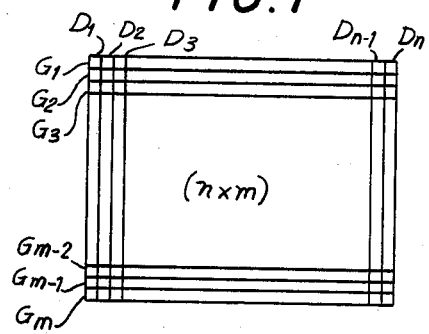
FIG.1
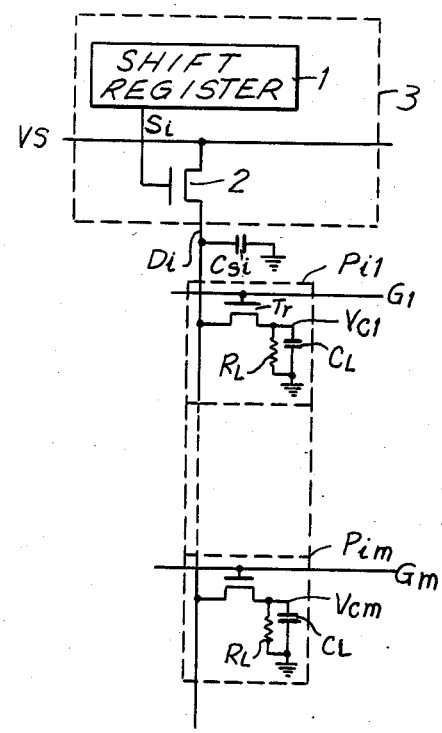
FIG.2
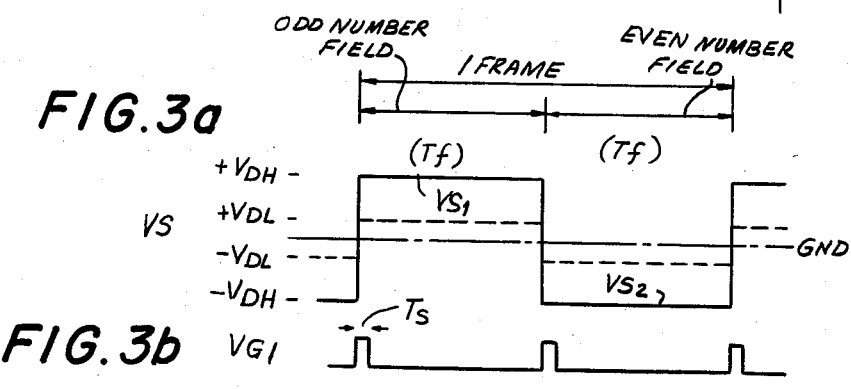
FIG.3a
FIG.3b
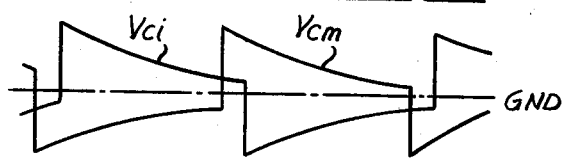
FIG.3c

FIG.4
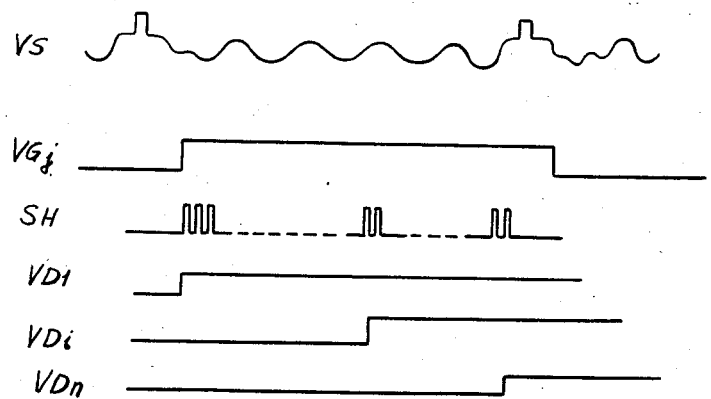
FIG.5
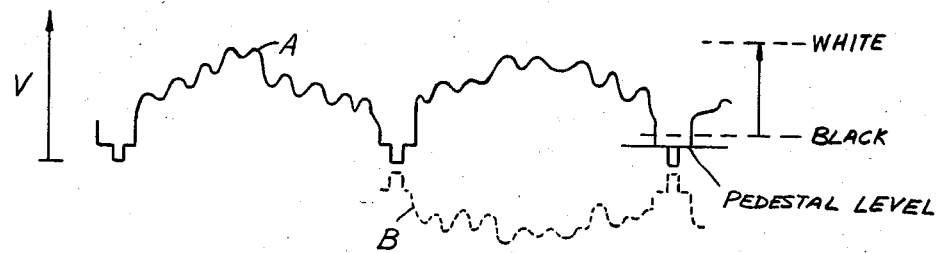
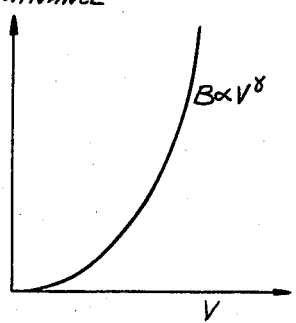
FIG.6
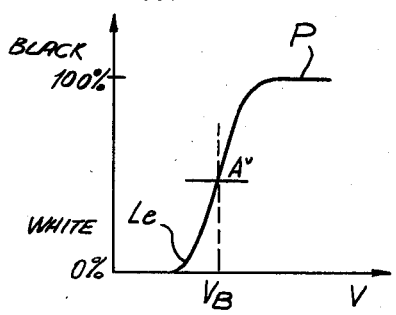
FIG.7

FIG. 15
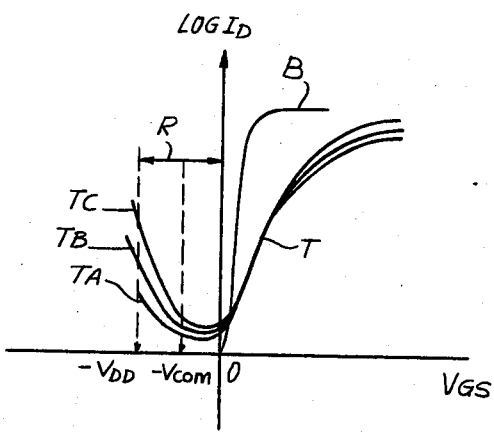
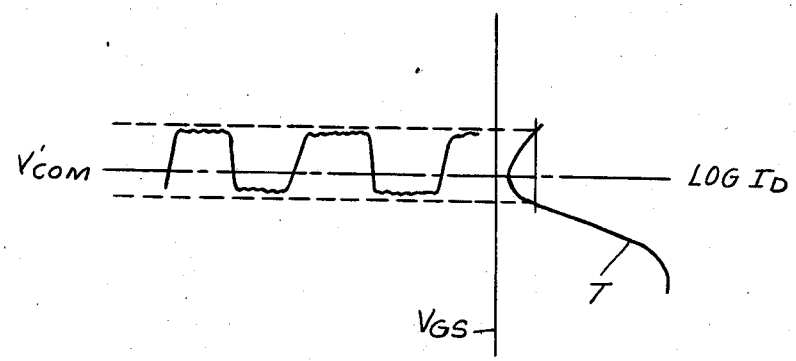
FIG. 21

FIG. 16
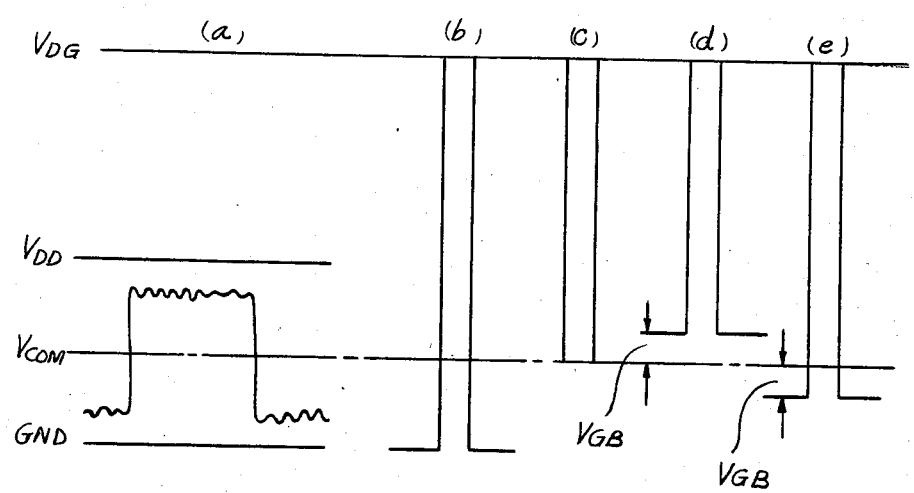
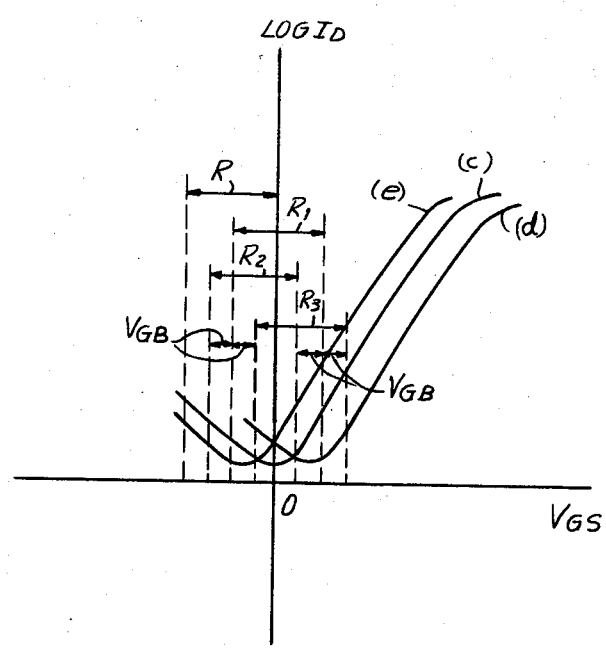
FIG. 17

MATRIX PANEL WITH AN ACTIVE DRIVING SYSTEM

BACKGROUND OF THE INVENTION

This invention relates generally to a driving system for an active matrix panel for a liquid crystal display device and more particularly to an active matrix panel utilizing thin film transistors. Heretofore, liquid crystal display has been used for small sized display devices such as a timepiece, and the like. However, today it is necessary to use aliquid crystal display for a large-sized display device such as a computer terminal or a pocket television, and the like, where the liquid crystal display is necessary to have a large area. However, in a conventional method, a generalized AC amplitude selected multiplexing method is limited to a driving duty cycle of 1/30 to 1/50 and it is difficult to realize a large-size display having a duty cycle, for example, of 1/500. In order to improve the driving duty cycle, it has been suggested to use a transistor such as a thin film transistor (TFT) or an active element such as metal-insulator-metal (MIM) element for writing and holding of data for each picture element. Strictly speaking, a MIM is not active but in this invention, it can be defined as an active element. There are other difficulties in adapting liquid crystals to a large type display such as for television signals. When a twisted nematic positive type liquid crystal is used in the matrix, the level of whiteness and blackness of the video image is inverted when the video signals, intended for cathode ray tubes, are used unmodified. Additionally, a video signal intended for a cathode ray tube, when applied to a liquid crystal of the twisted nematic type provides insufficient contrast in the range of whiteness. Additionally, thin film transistors suffer from much higher levels of backleakage such that the picture quality deteriorates between picture element selection in each picture field as a result of this leakage.

What is needed is an active matrix panel using liquid crystals which is capable of providing a large display with good quality suitable, for example, for television.

SUMMARY OF THE INVENTION

Generally speaking, in accordance with the invention, an active matrix panel especially suitable for applying liquid crystal elements to a video display is provided. In the matrix, a positive type liquid crystal of the twisted nematic type is driven by a thin film transistor arranged on a transparent substrate. The polarity of the video signal, originally generated for a cathode ray tube, is inverted within a driving circuit and the inverted negative video signal is used to drive the positive type liquid crystal display. Thus, whiteness as it would appear on a cathode ray tube provides whiteness on the liquid crystal matrix display. In the range of voltages of the video signal which correspond to the white level, the active matrix panel is driven by stretching the voltage of the video signal such that comparable voltage-contrast characteristics are achieved with the liquid crystal display as with the cathode ray tube. Leakage current of the thin film transistor during off-periods is reduced by setting a gate voltage during the off-period which is within the range of voltage level of the power source.

Accordingly, it is an object of this invention to provide an improved liquid crystal matrix display which provides gray scale contrast over an entire range comparable to that of a cathode ray tube.

Another object of this invention is to provide an improved liquid crystal matrix display which uses thin film transistors for inputting data to the picture elements, leakage during the off period of said transistor being reduced by setting a gate voltage in the range of the power source.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a representation of an active matrix panel;

FIG. 2 is a driving circuit of an active matrix panel and matrix cell;

FIGS. 3a, 3b, 3c and 4 are driving waveforms of the circuit of FIG. 2;

FIG. 5 illustrates waveforms of an inputted video signal;

FIG. 6 shows the illuminance versus voltage characteristic of a video signal for a cathode ray tube;

FIG. 7 shows the contrast versus voltage characteristic of a liquid crystal;

FIG. 15 illustrates transistor characteristics for a transistor in accordance with this invention and a conventional transistor;

FIG. 16 illustrates driving and gate signals in accordance with the invention;

FIG. 17 illustrates transistor characteristics in accordance with this invention;

FIGS. 21 and 22 illustrate alternate driving signals for use in a matrix in accordance with the invention.

DESCRIPTION OF THE PREFERRED EMBODIMENTS

Figure 8:
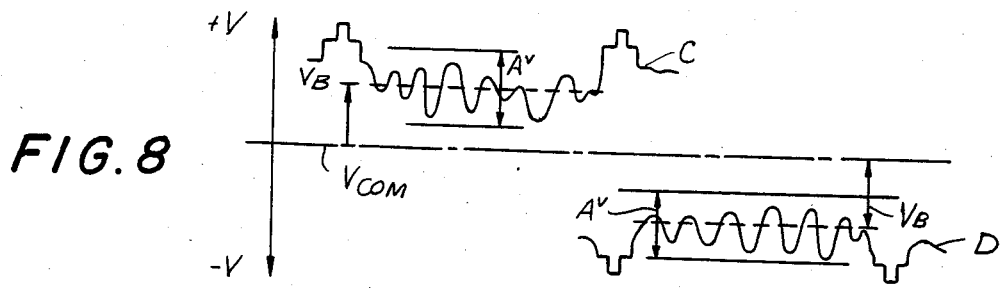
FIG. 8 illustrates a video signal as used in accordance with this invention.

FIG. 1 shows an active matrix panel wherein cells of (n × m) pieces are arranged in a matrix. In FIG. 1, each picture element in a cell is selected by a selecting signal on m gate lines and then data signals on n data lines are written into said selected picture element and held there.

FIG. 2 illustrates the structure of several cells using thin film transistors (TFT) in an active matrix relative to a specified data line Di. Cells in a quantity m are arranged in the column direction (vertically as illustrated in FIG. 2), for example, Pi1–Pim. The transistor Tr is turned On by a selecting signal on the gate line and display data on the data line is written into the picture element via the transistor. After writing the data, the transistor is turned OFF again and thereby the written data can be held until the next selection time of the transistor. The picture element comprised of a liquid crystal electrode is equivalently represented as a resistance RL and a capacitance CL which are connected to the transistor Tr. The data line Di is connected to a data driver 3 wherein a video signal VS is sampled by a transistor 2 in synchronism with selecting signal Si from a shift register 1 and held in a capacitor Csi on the data line Di. This is the so-called point at-a-time method.

FIG. 3 illustrates one type of waveforms applied to picture elements in accordance with a point-at-a-time driving method. As shown in FIG. 3a, one frame is divided into two fields wherein a positive video signal Vs1 is applied to the data line Di in the odd number field and a negative video signal Vs2 is applied in the even number field. A liquid crystal can be excited to a maximum level when the level of the video signal comes to be VDH and the liquid crystal is not excited when the level of the video signal is less than VDL. Thus, a gray scale of images can be reproduced in a liquid crystal display during the time when the video signal VS is within the range of $|VDH$ to $VDL|$.

FIG. 3b illustrates scanning signals which shift sequentially one-by-one and are applied to the gates of the transistors from the top gate line G1 to the bottom gate line Gm. For example, if there are 200 scanning lines during one image of a television picture, the period TS for scanning one gate line is 60 microseconds and the term of one field for forming one image is 16 milliseconds. Accordingly, the video must be written into the picture element within 60 microseconds by applying a scanning signal to the gate of the transistor, and the signal is held in the picture element during the remainder of the 16 milliseconds. FIG. 3c illustrates the waveform VC applied to the picture element in every field and kept in the picture element during the non-selected period. The waveform VC1 is formed on the picture element Pi1 during one field and waveform VCM is formed on the picture element Pim.

FIG. 4 illustrates the waveforms formed during the period of one horizontal scanning line. The video signal VS is sampled at the transistor 2 shown in FIG. 2, in synchronism with a clock signal SH during the period of applying a gate signal VGj to gate line Gj. The voltage level VD1-VDn, sampled from the video signal, is held on every data line D1~Dn respectively during gone period of horizontal scanning.

FIG. 5 shows a typical video signal supplied to the picture elements where for signal A, a high level of voltage relative to the pedestal level indicates a high level of luminance intensity. This relationship between the signal level and luminance level comes from the characteristic curve of a video signal for a cathode ray tube as illustrated in FIG. 6, wherein the signal voltage V is proportional to the luminance intensity B raised to the gamma ($\gamma$) power.

On the other hand, FIG. 7 illustrates the relationship between contrast and onset voltage for a twisted nematic positive type liquid crystal where contrast reaches approximately the 100% percent level, that is, a high degree of blackness, as onset voltage increases to the liquid crystal. That is, that signal which would provide high brightness on a cathode ray tube provides a high degree of blackness on such a liquid crystal device. Thus, the reproduced video image must be inverted for the liquid crystal display panel when a video signal intended for a cathode ray tube is directly applied to a twisted nematic positive type liquid crystal. Otherwise, a high level voltage gives a high degree of blackness.

When using a guest-host negative type liquid crystal, such inversion does not occur. However, the quality of reproducing a video image by using a guest-host negative liquid crystal is comparably inferior to that of a twisted nematic liquid crystal of the positive type. Furthermore, in order to drive the liquid crystal by an AC drive signal, the video B shown in FIG. 5 must be used by inverting the video signal A. Then, video signals A and B are applied to the liquid crystal alternately, changing with every field. However, it is disadvantageous in that the gray scale of the reproduced video image on the liquid crystal display always appears inverted when using a twisted nematic positive type liquid crystal.

An object of this invention is to provide driving means for a positive type liquid crystal for reproducing the gray scale of a video image more naturally in a liquid crystal display device.

FIG. 8 illustrates one type of waveform applied to a liquid crystal in accordance with the driving method of this invention. As a first step, a negative video signal C is produced by inverting the level of whiteness, gray scale and blackness of the video signal A shown in FIG. 5. Secondly, a video signal D is formed by inverting the negative video signal C. These signals are symmetrical to each other relative to the level of VCOM. Finally, a composite video signal is formed by synthesizing the signals C and D by alternatingly changing them with each other for every field. Further, a bias volage VB and amplitude level Av are adjusted to suitable levels for obtaining desirable display quality in recognition of the voltage-contrast curve shown in FIG. 7.

Figure 9:
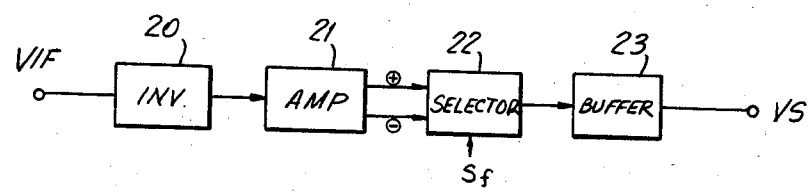
FIG. 9 is a block diagram of a circuit for generating negative composite video signals as illustrated in FIG. 8.

FIG. 9 is block diagram of a circuit for generating negative composite video signals in accordance with the invention. A video image signal VIF from an external circuit is supplied to an inverter 20 where the signal is inverted to a negative video signal. This negative video signal is applied to a symmetrical amplifier 21 which generates two different types of negative video signals. Namely, the bias voltages and amplitudes of these negative video signals are symmetrical with each other relative to a common level VCOM. The two types of video signals are applied to a selector 22 where one of the negative video signals is selected alternately with the other in every field in synchronism with a frame signal Sf and a composite negative video signal is formed. The composite negative video signal VS is finally applied to a picture element by way of a buffer amplifier 23.

Figure 10:
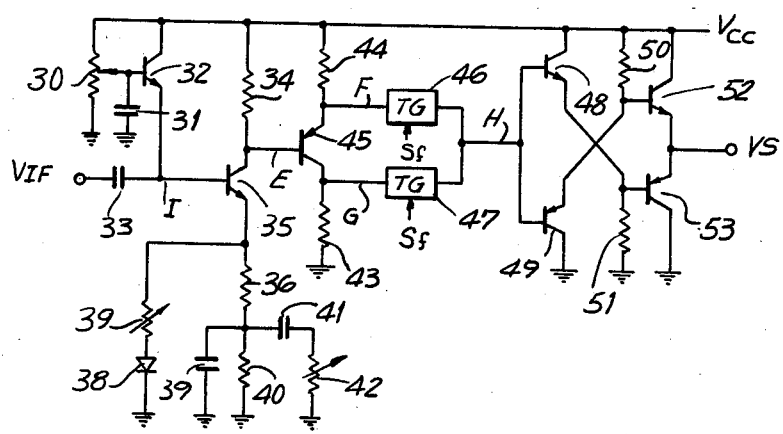
FIG. 10 is a circuit corresponding to the block diagram of FIG. 9.
Figure 11:
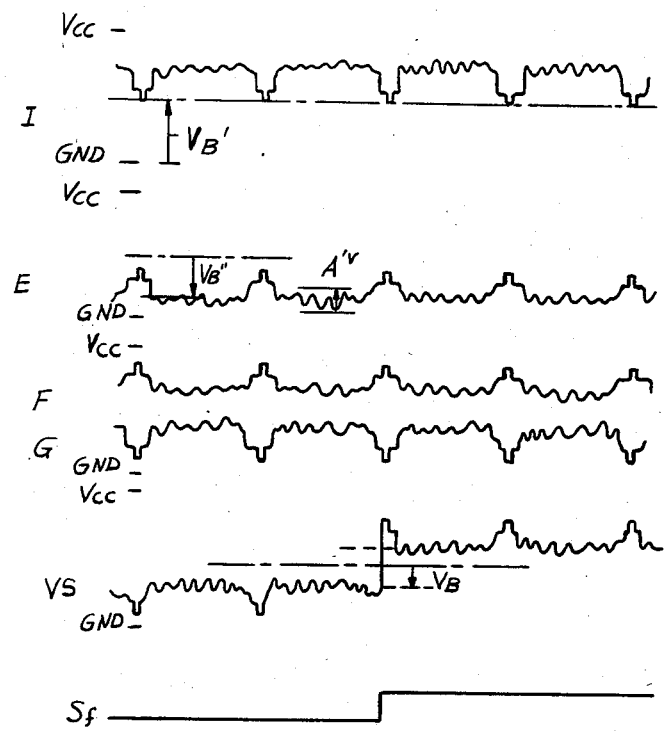
FIG. 11 is operating waveforms associated with the circuit of FIG. 10.

FIG. 10 is a circuit for generating negative composite video signals and FIG. 11 illustrates waveforms of video signals at the identified terminal points in the circuit shown in FIG. 10. Video signal VIF from an external circuit is applied to an inverter comprised of a transistor 35. A pedestal clamp level VB' of the video signal at the point I shown in FIG. 11 is adjusted by a transistor 32, variable resistor 30 and capacitor 31. This clamping level VB' determines the bias voltage VB of the composite negative video signal VS'. The inverter 20 is comprised of a transistor 35, collector side load resistor 34, and emitter side load resistors 36, 40.

The amplitude Av' of the negative video signal at point E is varied by controlling the impedance of the emitter side circuit comprised of the capacitor 41 and variable resistor 42. This means that the amplitude Av' of the composite video signal VS is controlled by adjusting the variable resistor 42. The symmetrical amplifier 21 is comprised of a transistor 45 and resistors 43, 44. This symmetrical amplifier generates two types of video signals F and G shown in FIG. 11. These signals F, G are inverted relative to each other.

Transmission gates 46, 47 comprised of CMOS bilateral switches select video signals F and G alternately every field in synchronism with the frame signal Sf and generate composite negative video signal VS. This composite video signal VS is amplified by the video buffer amplifier comprised of transistors 48, 49, 52, 53 and resistors 50, 51.

The video signal VIF from an external circuit (not shown) is constructed only for a cathode ray tube and its polarity is different from that of the above negative composite video signal. Furthermore, the waveform of the negative composite video signal has to be rearranged when generating this video signal by utilizing the video signal VIF, because there is much difference in voltage/luminance characteristics between a liquid crystal and a cathode ray tube display. These characteristics are non-linear. As illustrated in FIG. 6, voltage level is proportional to luminance with a power of $\gamma$ (gamma) when the video signal is used for a cathode ray tube. Thereby, the video signal VIF has a voltage-contrast characteristic curve (a) as shown in FIG. 12.

Figure 12:
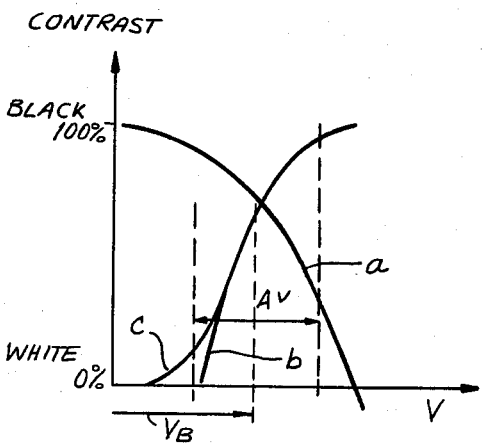
FIG. 12 illustrates the contrast versus voltage characteristics obtained in accordance with this invention.

By utilizing this video signal VIF, the negative composite signal VS is generated and its voltage-contrast characteristic is as shown in the curve (b) of FIG. 12 by setting the bias level VB and the amplitude Av. When comparing this curve (b) with the curve p of the twisted nematic liquid crystal illustrated in FIG. 7, it is understood that the curvatures of both curve (b) and p resemble each other at the point of the highest level of contrast, namely, at the point of highest level of blackness and are different from each other at the lowest level of contrast or whiteness. Therefore, the reproductive ability for a video image is extremely poor in the range from the lowest gray level to whiteness if the video signal having the characteristics of curve (b) of FIG. 12 is directly applied to a liquid crystal. Therefore, in accordance with the invention, voltage in the range of whiteness is stretched, especially in the range of approximately point Le of the voltage contrast curve shown in FIG. 7, in order to improve reproductive ability of the video image (c) in FIG. 12.

Figure 13:
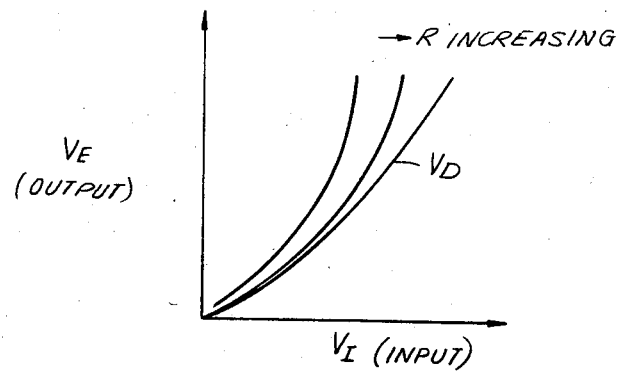
FIG. 13 illustrates the relationship between input voltage level and output voltage level in the circuit of FIG. 10.

Here the term "stretching voltage" of the video signal is defined as decreasing the voltage applied to the liquid crystal in order to gain a specified contrast in the range of whiteness. The variable resistor 37 and diode 38 in the circuit diagram of FIG. 10 is used for stretching voltage of the video signal. FIG. 13 shows a relationship between input levels VI to transistor 35 and output level VE. It is understood that the curvature of the curve VD is affected by the variation of the value R of the resistor 37, and the output level VE is remarkably stretched in the high level range of input VI. Thus, the stretched voltage characteristic curve (c) is obtained by utilizing the non-linearity of the diode 38 and controlling the value of the variable resistor 37. Therefore, a high amplitude level, namely, the range of the whiteness side of the video signal, is more stretched in both the negative and positive regions.

In accordance with this invention, it is advantageous in that the positive twisted nematic liquid crystal, showing the highest contrast of the liquid crystals, can be used for reproducing natural gray-scale images in a liquid crystal display device, and can be applied to compact-sized television utilizing liquid crystal display.

Figure 14:
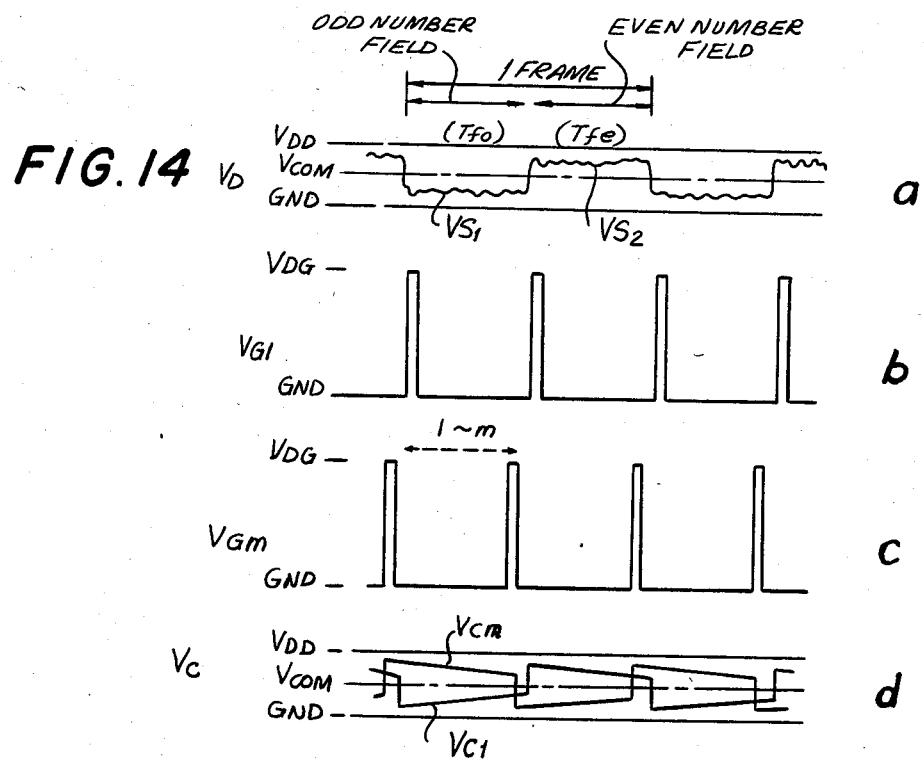
FIG. 14 is similar to FIG. 3 and illustrates a driving method for the circuit of FIG. 2.

A further discussion of a driver in accordance with the invention for an active matrix panel follows. FIG. 14 illustrates waveforms supplied to picture elements in a point-at-a-time driving method. In accordance with FIG. 14a, one frame is divided into two fields where a negative video signal VS1 is applied in an odd-numbered field and a positive video signal VS2 is applied in a even-numbered field to the data line Di (FIG. 2). Namely, video signals VS varying according to a level of gray scale of image are inverted alternately every field around a middle level VCOM within a range of GND to VDD. Further, FIGS. 14b, c, show scanning signals on the gate line G1 and Gm which are applied to the gates of the transistors Tr. When using N-type thin film transistors a voltage +VDG is applied to the gate when selecting the cell Pi–Pim. GND level is applied when the cell is non-selected. Accordingly, the voltage between the gate and the source of the transistor during an odd field term is substantially low compared with the voltage during an even field term because the negative video signal is applied to the source in the odd field term.

FIG. 14d illustrates a waveform Vc which is applied to a picture element for each field. This voltage, written into the picture element, must be stored in the picture element while the non-selected period waveform Vc1 is written information to the cell Pi1, and waveform Vcm to the cell Pim as shown in FIG. 2.

FIG. 15 illustrates V-I characteristics for two types of transistors, in particular drain current ID is represented along the ordinate and gate-source voltage VGS is the abscissa. The characteristic curve B indicates a conventional transistor comprised of a silicon monocrystal substrate. The curve T illustrates a thin film transistor comprised of polycrystalline or an amorphous thin film.

In accordance with curve B, there is a favorable characteristic in that drain current ID rises steeply with an increasing gate-source voltage VGS in the positive regions, and leakage current ID is extremely small and constant in the zero or negative region. When using a conventional transistor for an active matrix display, it is a disadvantage in that the materials of the liquid crystal used for the liquid crystal display panel are necessarily of the guest-host type or dynamic scattering type liquid crystal because a mono-crystalline substrate is opaque. However, the substrate is required to be transparent for utilizing a twisted nematic liquid crystal which shows the highest quality of display performance. Then it has been considered to provide a thin film transistor on a glass substrate or a SiO2 quartz substrate. Principally, a transistor using a silicon thin film such as poly-crystal silicon or amorphous silicon has been developed.

However, compared with the conventional transistor, the thin film transistor (TFT) has the disadvantages in the characteristics curve T as shown in FIG. 15. In particular, the drain current increases freely in the positive region and the leakage current varies with the negative bias voltage VGS and this leakage current is relatively large even at the minimum point in the negative region. Therefore, the following disadvantages must be considered when this type of transistor is used for driving a liquid crystal in the manner as shown in FIG. 14.

First, during the period of non-selection, charge held in each picture element leaks away to the data line via the transistor or charge on the data line flows into a picture element since the leakage level is relatively high at the OFF state of the transistor. Thus, contrast quality of the display is deteriorated by the above malfunction.

Secondly, the range R (FIG. 15) illustrates the operating region of the transistor during the non-selected period. It should be understood that leakage current in the even field is relatively great compared to that in the odd field since the maximum amplitude of video signal in the even field comes to be nearly VDD. Furthermore, in the final scanning line of the even field, the amount of leakage current builds up where the polarity of the video signal on the data line is inverted in the next field, because the potential difference between picture element and data lines comes to be a maximum value and the voltage between the source and drain is also at the greatest value.

In FIG. 15, TA, TB, and TC show variations of characteristic curves T depending on the different values of voltage between source and drain V1. More particularly, in FIG. 15 the curve TA is for two volts, the curve TB is for four volts and the curve TC is for eight volts between source and drain. Therefore, the effective value applied to the picture element in the lower end portion decreases and this causes a non-uniform display phenomenon.

Finally, the gate voltage VG has to be relatively greater in order to obtain the second level of drain current as compared with a mono-crystalline substrate transistor. This means that VDG has to be greater and sometimes exceeds the breakdown voltage of the driver IC or makes power consumption increase.

An object of this invention is to eliminate the above disadvantages and offer high quality of display showing uniform images and providing means for biasing the gate properly. This invention discloses means for biasing the voltage level of the gate to some degree during non-selected periods within the range of the power source of the data line driver IC (integrated circuit) while considering the characteristics of the thin film transistor as shown in FIG. 15. On the other hand, the potential level during the non-selected period is set to be zero, that is, ground level, on the data line driver integrated circuit in the prior art.

FIG. 16 illustrates the waveform of a video signal and gate signal where the waveform (b) indicates prior art and (c), (d) and (e) represent this invention.

Video signal (a) is set to be a symmetrical waveform around the common level VCOM alternating with every field. Namely, the source voltage of the drive for the data line is set to be within the range of GND to VDD. On the other hand, the level of onset voltage to the gate line during the non-selected period is set to be approximately VCOM shown at (c) of FIG. 16. As a result, the operating range R of the transistor during the non-selecting period is shifted to the range R1' which spans the zero level as illustrated in FIG. 17. This bias shift can contribute to a decrease of leakage current.

Furthermore, the thin film transistor can be made free from dependency of leakage current on source to drain voltage described above by biasing the non-selected level of gate voltage. This approach avoids piling up of leakage current at the final line of an even field in deterioration of image contrast from the upper portions to the lower portion in the field. Thus, uniform quality of image over the entire field is obtained. Additionally, the amplitude of gate voltage becomes VDG-VCOM which can be a lower level by VCOM as compared with that of the prior art, in order to obtain the same level of ON current.

As illustrated in FIG. 17 at (c), (d) and (e), there are some substantial differences of V-I characteristics, especially the minimum points of drain currents in accordance with the different manufacturing processes, and condition of construction of every transistor. R1 is the operating range of a transistor having the characteristic of the curve c. R2 is the operating range of a transistor having the characteristic of the curve e, and R3 is the operating range of a transistor having the characteristic of the curve d. Thus, there needs to be compensation for reducing the above differences. For example, the non-selected level of gate voltage biased by +VGB (−VBG) toward VCOM shown in FIG. 16(d) or (e) is applied to the gate of the transistor (d) or (e) shown in FIG. 17 having the minimum point of drain current located in the positive (negative) region. This biasing can contribute further to decreasing of the leakage current.

Figure 18:
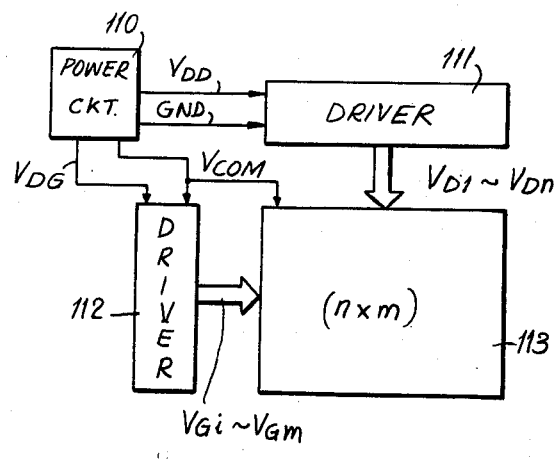
FIG. 18 is a functional diagram of driving circuits in accordance with the invention.

FIG. 18 illustrates an embodiment of a driving circuit using a driving method in accordance with this invention. In FIG. 18, a driver 111 for data lines and a driver 112 for gate lines are connected to a panel 113 constructed as a matrix substrate. In the construction, the driver 111 has driving outputs of VD1–VDn and driver 112 has driving outputs of VG1–VGm. A power circuit 110 generates power voltage, that is, VDD and GND applied to a sample and hold circuit of the driver 111 for the data lines and a shift register within the driver 111. The amplitude of the video signals VS is within a range of VDD–GND. Also, the power circuit 110 generates voltage levels for the gate lines, that is, VCOM for a non-selected level and VDG for the selected level. VCOM is also the potential of the opposite common electrode of an active matrix panel.

Figure 19:
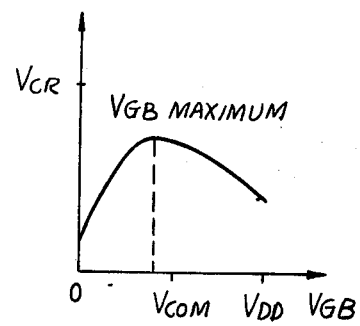
FIGS. 19 and 20 are graphs showing the effects of transistor construction and driving techniques in accordance with the invention.

FIG. 19 is a graph showing the effects of this invention. In FIG. 19, an average root-mean-square value VCR of every picture element is plotted against the bias voltage VGB where a specified level of video signal is applied to one picture element and is kept on this element during a 16 millisecond period. It is understood that the value of the root-mean-square value VCR is taken to be minimum at a time when VGB is equal to zero adopted in a conventional method. On the contrary, in accordance with this invention, VGB is set to approximately the value of VCOM and this gives a maximum value of root-mean-square VCR and high quality of image display.

Figure 20:
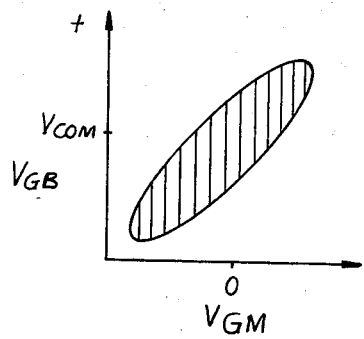

In FIG. 20, VGM is a value of gate-source voltage VGS which provides a minimum value of current considering the TFT characteristics. FIG. 20 illustrates a range of non-selected level of VGB against VGM. VGB is the value which minimizes decreasing of the root-means-square value for providing favorable video contrast in a liquid crystal display. According to this graph it is necessary to adjust the non-selected level of VGB in accordance with VGM depending upon the thin film transistor characteristics.

FIG. 21 is the waveform of a video signal of an alternative embodiment in accordance with this invention. When the characteristic T of the thin film transistor is non-symmetrical with respect to VGS, the voltage level for driving of the data line can be said to be non-symmetrical with respect to V'COM. In the above situation there are two possibilities. One is that a level is set so that only the amplitude or the bias of the video signal VS is non-symmetrical with respect to V'COM in each field by controlling the gain of +(−) amplifier or by controlling the DC output level of the amplifier. The other approach is that a level is set so that the power source electrical potentials are non-symmetrical with respect to VCOM.

It is better that a data line is set to be non-symmetrical in accordance with the characteristic of the thin film transistor. It is also possible that the non-selected level of the gate is set to be ±VGB bias with respect to V'COM.

Figure 22:
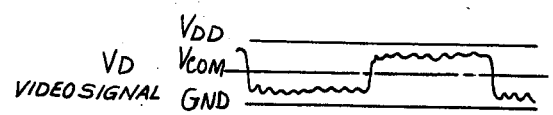
Figure 22:
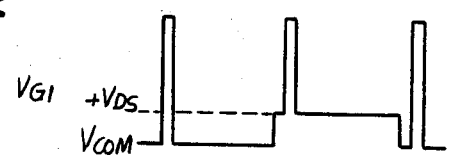

FIG. 22 illustrates a signal wave showing another embodiment of a driving system in accordance with this invention. In this embodiment, the non-selected level of gate voltage can be changed every field accompanying the inversion of polarity of the video signal. This contributes to a reduction in the range of variation of VGS (gate-source voltage) according to the variation of level of the video signal by approximately half. As a result, the root-mean-square value of a picture element is more favorable. In this embodiment, the non-selected level of gate voltage is VCOM in an odd field and +VDS in an even field.

This invention, as stated above, sets the non-selected level of gate voltage within a range of the power voltage and in particular, sets the level around the center potential VCOM of the inverse video signal. In accordance with this driving method, the following effects are obtained and thereby a liquid crystal television having a higher quality display is provided.

First, as the most suitable root-mean-square value of picture elements is provided, a display effect corresponding to the original video signal is obtained. Therefore, a most suitable display contrast can be offered. Secondly, a drop of the root-means-square value of the picture element in the side of the last scanning line, accompanied with an increase of off-current at negative bias between gate and source can be prevented. Accordingly, uniform voltage can be written into picture elements in any scanning line and the uniform root-mean-square value of picture elements can be obtained from any scanning line and thereby unevenness of displaying is eliminated. Finally, as amplitude of the gate line voltage is reduced, the driver integrated circuit is designed more easily and further power consumption is reduced.

It will thus be seen that the objects set forth above, among those made apparent from the preceding description, are efficiently attained and, since certain changes may made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An active driving system for a liquid crystal matrix panel, having a plurality of cells each including a transistor for switching the cell on and off during selected and non-selected periods respectively and a picture element, said matrix panel receiving an external vidoe signal adapted to a cathode ray tube display and a frame signal, the active driving system comprising: inverter means for inverting the polarity of the external video signal; scaling means coupled to the inverter means for symmetrically amplifying the inverted video signal to produce two negative-video signals having bias voltages and amplitudes which are symmetrical to a common voltage level; and selector means coupled to the scaling means for producing a composite negative-video signal by alternating selecting the two negative-video signals.

2. An active matrix panel as claimed in claim 1, wherein said liquid crystal is a twisted nematic positive type.

3. The active driving system of claim 1 wherein the scaling means varies the amplitude and bias voltages of the two video signals to scale the range of voltages of the negative video signals to correspond to the brightness-voltage characteristics of the liquid crystal matrix panel.

4. The active driving system of claim 1 further comprising stretching means for extending the range of voltages of the external video signals from the narrow voltage for a cathode ray tube display to a broader voltage range necessary to cover a fuller range of contrasts in the liquid crystal than would be possible with the external video signal.

5. An active matrix panel as claimed in claim 3, wherein said liquid crystal is a twisted nematic positive type.

6. An active matrix panel as claimed in claim 4, wherein said liquid crystal is a twisted nematic positive type.

7. The active driving system of claim 1 wherein the scaling means is adapted to produce voltages in a range between a high driving voltage and ground and the gate voltage of each of the transistors during non-selected periods is in the voltage range of the scaling means.

8. The active driving system of claim 7 wherein the gate voltages of the transistors are proximate to the common voltage level.

9. The active driving system of claim 3 further comprising stretching means for extending the range of voltages of the external video signal from the narrow voltage range for a cathode ray tube display to a broader voltage range necessary to cover a fuller range of contrasts in the liquid crystal than would be possible with the external video signal.

10. The active driving system of claim 3 wherein the scaling means is adapted to produce voltages in a range between a high driving voltage and ground and the gate voltage of each of the transistors during non-selected periods is in the voltage range of the scaling means.

11. The active driving system of claim 4 wherein the scaling means is adapted to produce voltages in a range between a high driving voltage and ground and the gate voltage of each of the transistors during non-selected periods is in the voltage range of the scaling means.

12. The active driving system of claim 9 wherein the scaling means is adapted to produce voltages in a range between a high driving voltage and ground and the gate voltage of each of the transistors during non-selected periods is in the voltage range of the scaling means.

13. The active driving system of claim 1 wherein the selector means alternates selecting between the two negative video signals is synchronized with the frame signal.

14. An active driving system for a liquid crystal matrix panel, having a plurality of cells each including a transistor for switching the cell on and off during selected and non-selected periods, respectively and a picture element, said matrix panel receiving an external video signal adapted to a cathode ray tube display and a frame signal, the active driving system comprising: inverter means for inverting the polarity of the external video signal; scaling means coupled to the inverter means for amplifying the inverted video signal to produce two negative-video signals having amplitudes, which are symmetrical with respect to a common voltage level, and first and second bias voltages which have opposite voltage polarities; and selector means coupled to the scaling means for producing a composite negative-video signal by alternately selecting the two negative-video signals.

15. The active driving system of claim 14 wherein the bias voltages for the first and second negative video signals are unequal.

16. The active driving system of claim 15 wherein the scaling means varies the bias voltages of the two video signals to scale the range of voltages of the negative video signals to correspond to the brightness-voltage characteristics of the liquid crystal matrix panel.

17. The active driving system of claim 15 further comprising stretching means for extending the range of voltages of the external video signal from the narrow voltage range for a cathode ray tube display to a broader voltage range necessary to cover a fuller range of contrasts in the liquid crystal than would be possible with the external video signal.

18. The active driving system of claim 15 wherein the scaling means is adapted to produce voltages in a range between a high driving voltage and ground and the gate voltage of each of the transistors during the nonselected period is in the voltage range of the scaling means.

19. The active driving system of claim 18 wherein the gate voltages of the transistors are proximate to the common voltage level.

* * * * *